(12) United States Patent
Christie Remy-Maillet

(10) Patent No.: US 12,441,031 B2
(45) Date of Patent: Oct. 14, 2025

(54) SYSTEM AND METHOD FOR DESIGNING AND MANUFACTURING OBJECTS HAVING AN OPTIMISED FREE-FORM WITH NOVEL COMPOSITE MATERIALS AND THE RESULTING OBJECT

(71) Applicant: Strong by Form SpA., Santiago (CL)

(72) Inventor: Jorge Andrés Christie Remy-Maillet, Santiago (CL)

(73) Assignee: Strong by Form SpA., Santiago (CL)

( * ) Notice: Subject to any disclaimer, the term of this patent is extended or adjusted under 35 U.S.C. 154(b) by 512 days.

(21) Appl. No.: 17/642,159

(22) PCT Filed: Sep. 13, 2019

(86) PCT No.: PCT/CL2019/000030
§ 371 (c)(1),
(2) Date: Mar. 10, 2022

(87) PCT Pub. No.: WO2021/046660
PCT Pub. Date: Mar. 18, 2021

(65) Prior Publication Data
US 2022/0314484 A1    Oct. 6, 2022

(51) Int. Cl.
*B29C 70/30*     (2006.01)
*B27D 1/08*     (2006.01)
(Continued)

(52) U.S. Cl.
CPC .......... *B29C 33/3842* (2013.01); *B27D 1/083* (2013.01); *B27G 11/00* (2013.01);
(Continued)

(58) Field of Classification Search
CPC .................................................. B29C 70/30
(Continued)

(56) References Cited

U.S. PATENT DOCUMENTS 6,309,711 B1    10/2001    Tseng et al.
6,519,500 B1    2/2003    White
(Continued)

FOREIGN PATENT DOCUMENTS

CN    107206622 A    9/2017
CN    108472727 A    8/2018
(Continued)

OTHER PUBLICATIONS

International Search Report issued in connection with PCT Application No. PCT/CL2019/000030 dated Jun. 8, 2020.
(Continued)

*Primary Examiner* — Christina A Johnson
*Assistant Examiner* — Xue H Liu
(74) *Attorney, Agent, or Firm* — Dennemeyer & Associates LLC

(57) ABSTRACT

A system and method for designing and manufacturing free-form objects made of composite material and optimised in their weight ratio and load capacity; a system for the design and manufacture of said objects, and the objects resulting from said method. Using three-dimensional (3D) design computer programs and computer calculation programs, the design of a composite material object is obtained, with a specific shape and orientation of its component fragments, optimised to be light and at the same time to meet a required specific mechanical and/or structural performance. Subsequently, a mould of at least two parts is obtained from this design and the parameters of said design are transformed into instructions so that one or more automated manufacturing machines deposit fragments of wood or another material onto the lower part of the mould in specific orientations, calculated to minimise the weight of the object and optimise its load capacity. Then, with the addition of one or more binders, the object is pressed (Continued)

between the parts of said mould. Finally, the new manufactured object is obtained by removing it from the mould.

13 Claims, 6 Drawing Sheets

(51) Int. Cl.
  *B27G 11/00* (2006.01)
  *B29C 33/38* (2006.01)
  *B29C 43/00* (2006.01)
  *B22F 10/10* (2021.01)
  *B22F 10/85* (2021.01)
  *B29C 43/02* (2006.01)
(52) U.S. Cl.
  CPC ............ *B29C 43/003* (2013.01); *B29C 70/30* (2013.01); *B22F 10/10* (2021.01); *B22F 10/85* (2021.01); *B29C 43/02* (2013.01)
(58) Field of Classification Search
  USPC ........................................................ 264/239
  See application file for complete search history.

(56) References Cited

U.S. PATENT DOCUMENTS

| | | | |
|---|---|---|---|
| 6,799,081 | B1 | 9/2004 | Hale et al. |
| 8,568,549 | B2 | 10/2013 | Meyer et al. |
| 10,232,443 | B2 | 3/2019 | Myerberg et al. |
| 2008/0251975 | A1 | 10/2008 | Gallagher et al. |
| 2015/0239178 | A1 | 8/2015 | Armstrong |
| 2016/0283648 | A1 | 9/2016 | Akiba |

FOREIGN PATENT DOCUMENTS

| | | |
|---|---|---|
| CN | 108698297 A | 10/2018 |
| EP | 0916437 A1 | 5/1999 |
| EP | 1184147 A2 | 3/2002 |
| EP | 3196238 A1 | 7/2017 |
| EP | 3292992 A1 | 3/2018 |
| EP | 3321055 A1 | 5/2018 |
| WO | 2015108544 A1 | 7/2015 |

OTHER PUBLICATIONS

Extended European Search Report (EESR) for EP 19944689 issued on Aug. 21, 2023.

SYSTEM AND METHOD FOR DESIGNING AND MANUFACTURING OBJECTS HAVING AN OPTIMISED FREE-FORM WITH NOVEL COMPOSITE MATERIALS AND THE RESULTING OBJECT

CROSS-REFERENCE TO RELATED APPLICATIONS

This is a 35 U.S.C. 371 National Stage Patent Application of International Application No. PCT/CL2019/000030, filed Sep. 13, 2019, which is hereby incorporated by reference in its entirety.)

TECHNICAL FIELD

System and method for designing and manufacturing optimised free-form objects with novel composite materials, and the resulting object.

In the field of construction and manufacturing of load-bearing objects without any shape limitations, the need to make such objects with fewer materials, lighter weight, lower energy consumption and lower carbon emissions has become an important pursuit in the relevant industries, for both economic and sustainability reasons.

In this context, there are various industries that are resorting to new technologies and light materials to meet sustainability objectives such as reducing energy consumption (as is the case of the transport industry) and to make more efficient use of raw materials (as is the case of the construction industry).

State of the Art

Currently, there are digital design and manufacturing processes that aid manufacturers in the development of objects with specific mechanical and structural requirements. In this context, there are digital design tools, for example CAD (Computer Aided Design) computer programs, that help make is easier to design three-dimensional objects. There are also computer programs for structural calculation. At the same time, there are machines that operate with CNC (Computer Numerical Control) systems, for automated manufacturing, subtractive manufacturing and additive manufacturing, to manufacture said designs. For example, document U.S. Pat. No. 5,121,329A (D1) teaches about an additive manufacturing system that comprises the three-dimensional design of objects in CAD-type computer programs, and the subsequent steps of sending orders to a CNC-type machine so that it manufactures a three-dimensional object by means of the extrusion of a thermoplastic material that is deposited in overlapping layers until the three-dimensional object of thermoplastic material designed in the CAD program is obtained.

As for the materials available for manufacturing lightweight objects, aluminium and plastics reinforced with carbon fibre or fibreglass are widely used. Although these materials can be light, and the aforementioned computer programs can help optimise their shapes, these materials are far from being sustainable, since their production processes are very intensive in $CO_2$ emissions.

On the other hand, in the field of sustainable construction, some wood-based products are also known that are indeed renewable, and whose production processes generate less $CO_2$ than other materials, such as plywood, moulded wood, and OSB (Oriented Strand Board) particleboard. For example, document U.S. Pat. No. 4,364,984A (D2) describes an OSB board and its structural characteristics based on layers of oriented wood particles that are superimposed and pressed to obtain said boards.

Composite materials based on other plant fibres, such as jute, flax and hemp, and some hybrid composite materials containing a percentage of plant fibres combined with carbon fibres, are also known. These technologies are good solutions for non-structural applications, but they do not achieve the structural performance of the aforementioned materials due to their low mechanical performance and/or their high weight. They also have important limitations on productivity since their manufacture requires labour-intensive processes and, additionally, they have limitations due to limited anisotropy, given that the woven textile materials with which the most-used compounds are reinforced have specific directions in their fibres (usually orthogonal or with specific angles), which results in the orientation of the fibres not efficiently following the paths of the stresses to which the object is subjected. This translates into a decrease in the structural performance of the objects and/or their greater weight.

On the other hand, plywood composites made from sheets of wood have very high shape restrictions in moulding processes, and do not allow small radii of curvature. They are also orthotropic, which reduces their efficiency and increases the weight of the components. This makes them suitable only for applications where weight is not an important variable.

In short, the most sustainable alternatives available for manufacturing lightweight objects fail to meet high mechanical and/or structural performance requirements, and the options that do meet mechanical and/or structural performance requirements are not sustainable.

Consequently, there is a need for new methods, systems and materials for manufacturing lightweight objects.

In this context, our invention of a new system and method for designing and manufacturing optimised free-form objects with novel composite materials and the resulting object offers a solution to the need for lightweight objects with high structural performance that are more sustainable than currently used materials, such as aluminium, stamped metal or reinforced plastic, and at the same time with higher mechanical and/or structural performance than other wood composite technologies.

DESCRIPTION OF THE INVENTION

Our invention overcomes the limitations of the known methods and materials by integrating into a unified and automated process: digital design, digital simulation, digital structural analysis, weight optimisation, automated manufacturing of lightweight structural objects, and new composite materials. Thus, our system and method is capable of optimising objects with mechanical and/or structural requirements at two levels: the first regarding the optimisation of shapes, and the second regarding the optimisation of the orientation of the fibres or fragments of the material, so that its orientation efficiently follows the paths of the stresses to which the object is subjected. This combination of variable control allows us to produce free-form elements with high mechanical and/or structural performance, allowing the manufacture of objects with three-dimensional designs of complex geometry and integrating various functions, with greater strength and less weight than objects currently produced with other technologies and/or materials.

Our invention consists of a system made up of at least one computer with one or more computer programs for design, calculation and analysis, one or more machines for depositing material that operate with computerised numerical control, fragments of material or materials, binder, at least one mould and at least one press.

The system and method for designing and manufacturing optimised free-form objects with novel composite materials, and the resulting object, consists of: obtaining the formal and structural requirements of the part to be manufactured; defining the measurable physical parameters of the part to be manufactured; designing, simulating, analysing, redesigning, simulating and analysing N times in a data feedback loop, using specialised computer programs, until an optimised three-dimensional digital design is obtained; converting the optimised three-dimensional digital design into digital instructions; obtaining a mould according to the three-dimensional design obtained; sending the digital instructions to deposition machinery; depositing material fragments, preferably wood, in the mould in specific orientations calculated to optimise the stresses of the resulting object; optionally also depositing binder in the mould according to the digital instructions; pressing the fragments together with the binder in the mould; and finally opening the mould to obtain the finished object, the object having the characteristics of being light and having high mechanical and/or structural performance. If the particles used are made of wood, it will also be a sustainable and renewable object.

One example of an application of our invention is in seats for public transport vehicles, such as buses and trains.

Figure 1:
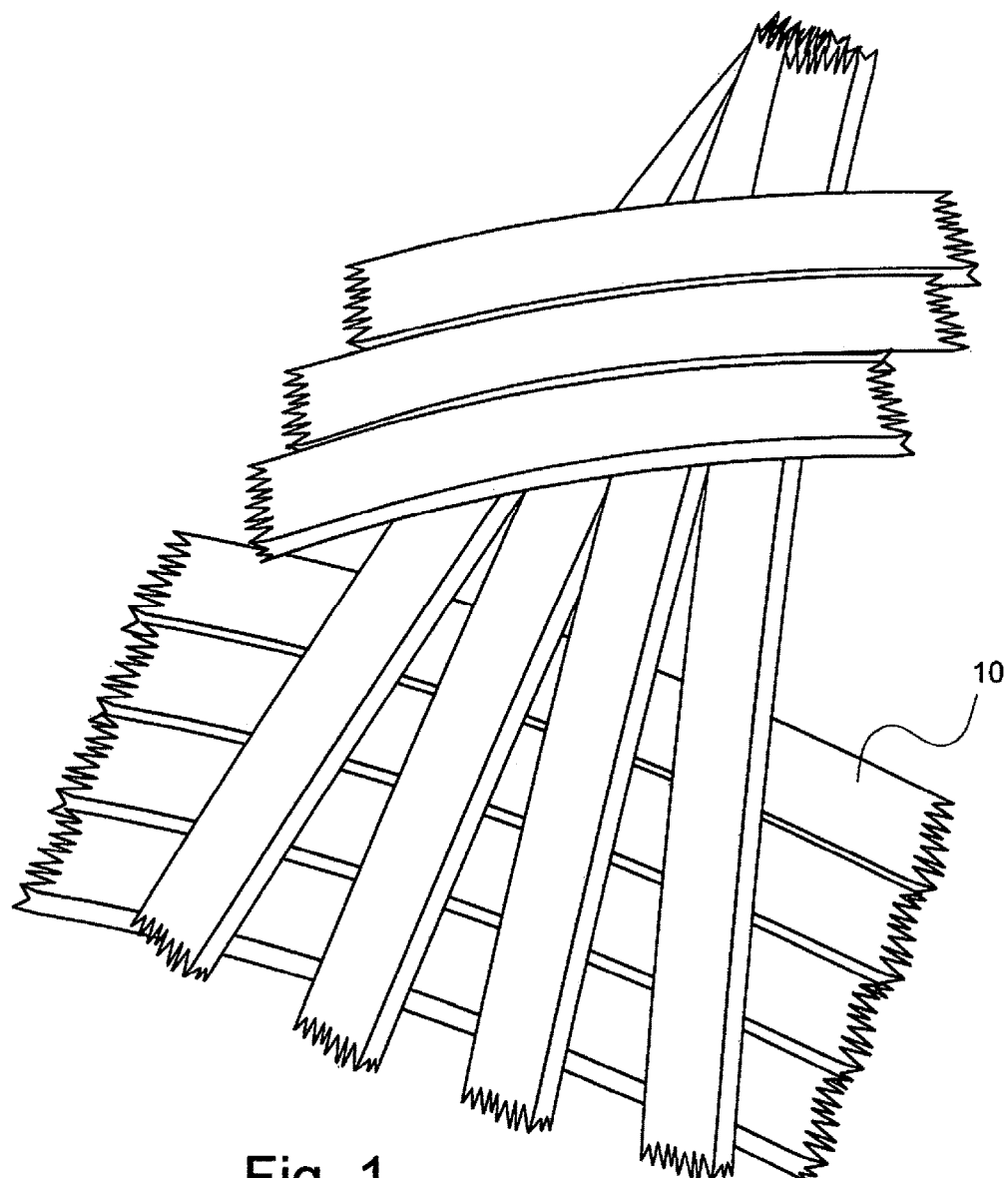
FIG. 1 is an exemplary drawing of a possible configuration of fragments, preferably wood fragments, obtained after the process of designing and optimising the orientation of the fragments.

It should be noted that the figures are not drawn to scale, and that for illustrative purposes the elements, their parts and the steps are represented by similar reference numerals in all figures. It should also be noted that the figures are only intended to facilitate the description of some of the preferred embodiments, and do not illustrate the other possible embodiments, or every aspect of the embodiments described, so the figures do not limit the scope of this disclosure.

DETAILED DESCRIPTION OF THE PREFERRED EMBODIMENT

Because the materials and manufacturing systems and methods that are currently available are deficient in the manufacture of objects that combine characteristics of high mechanical and/or structural performance with being light, and/or are deficient in characteristics of lower environmental impact and sustainability, it may be desirable to develop a new system and method for designing and manufacturing optimised free-form objects with novel composite materials and the resulting object, which manages to manufacture objects that combine properties of high mechanical and/or structural performance with being light, also having characteristics of lower environmental impact and sustainability, and that can be used in a wide variety of industries that increasingly require objects with these characteristics, such as construction, transportation, furniture, appliances and others.

For example, in one of the applications mentioned herein, mention is made of the transportation industry and its need to lighten the weight of vehicle components in order to save fuel and/or energy, and consequently emit less $CO_2$.

FIG. 1 illustrates an example of what the configuration of fragments (10) of a section of a piece of a part manufactured with the system and method proposed in the present invention would look like up close.

Figure 2:
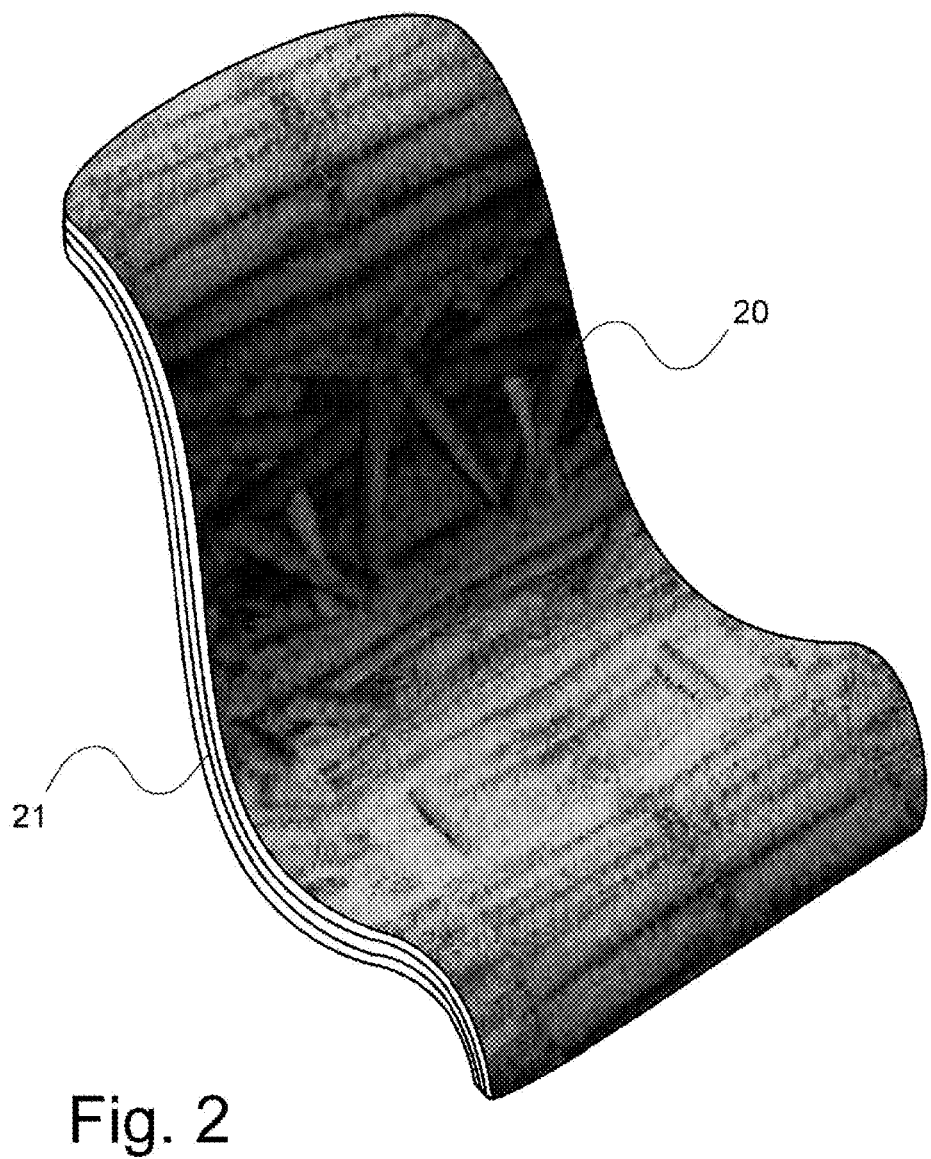
FIG. 2 is an exemplary perspective drawing of a seat design, preferably for buses or trains.

FIG. 2 illustrates by way of example a seat with optimised design and materials for use in buses or trains, which comprises wood fragments (20) in a specific sequence and orientations, determined by our digital free-form design optimisation process, and layers (21) of wood fragments. In other embodiments of the invention, the resulting object may have a single layer, or it may have multiple layers, its thickness being greater in some areas of the object than in others, depending on the formal and mechanical requirements of the object.

Figure 3:
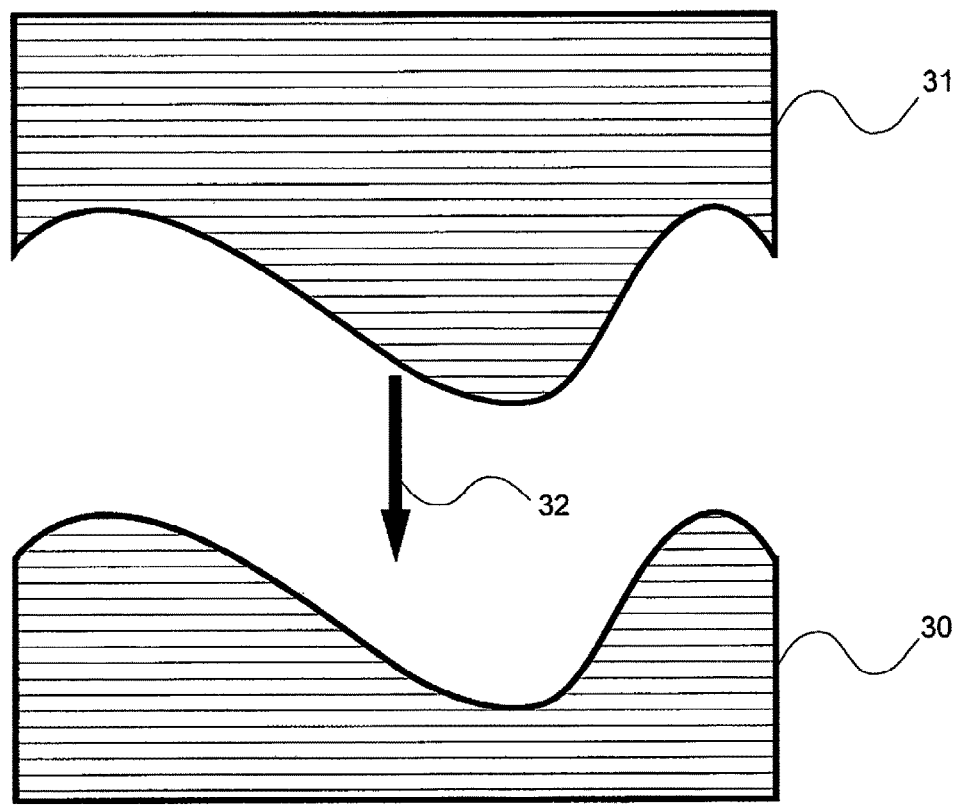
FIG. 3 is an exemplary drawing of a possible type of mould with 2 parts, similar to a mould for the seat of FIG. 1.

FIG. 3 illustrates by way of example a possible type of mould, in this case with 2 parts, similar to a mould that can be used to manufacture a seat like that of FIG. 1. In FIG. 3 we can see the lower part of the mould (30), the upper part of the mould (31), and the movement vector of the force (32) to press the deposited material between the parts of this mould. In another embodiment, it may be the lower part of the mould that is moved, exerting force upwards to press the deposited material against the upper part of the mould.

In another embodiment, both parts of the mould can move towards one another until the deposited material is pressed. In other embodiments, it can consist of vacuum moulds. In further embodiments, the mould can have more than 2 parts.

Figure 4:
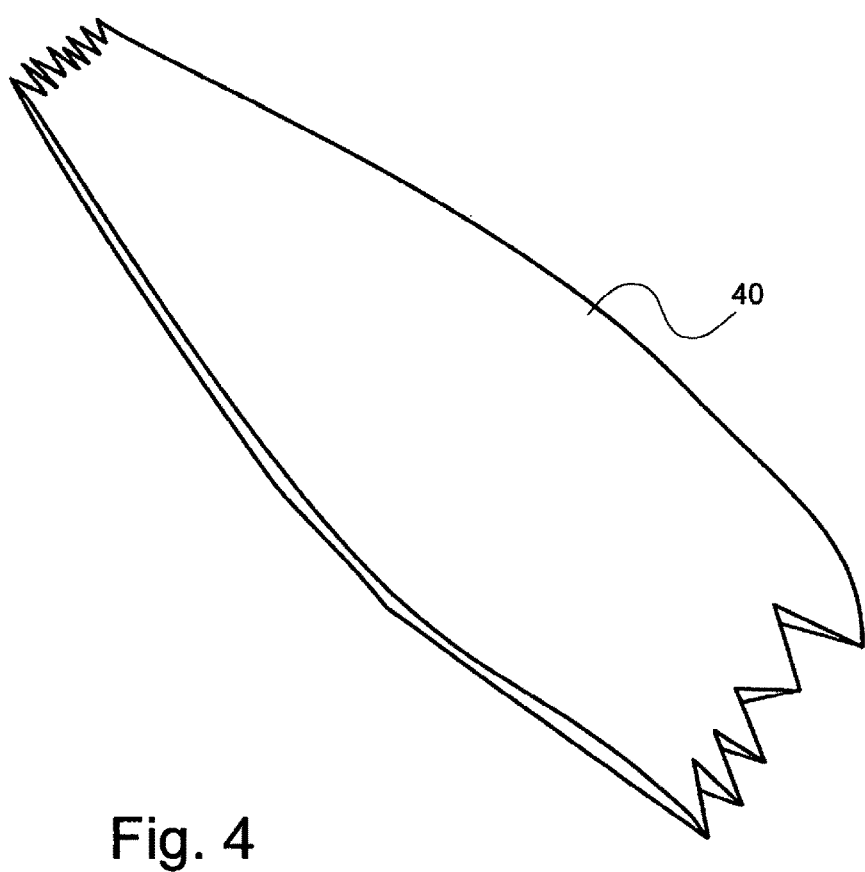
FIG. 4 is an exemplary drawing of a typical irregularly shaped wood fragment, or wood chip.

FIG. 4 illustrates an example of a wood fragment (40) with irregular shape and surface, or wood chip. It should be noted that the scale and shape of the fragments is not limited to those illustrated in these exemplary drawings. In some embodiments the size of the fragments will be as small as a sawdust particle. In other embodiments it will be a long piece or large fragment of wood or another material. In other embodiments, it will be an irregular fragment like a chip. In other embodiments, the fragments may be of different sizes and/or shapes and/or materials. In other embodiments, the material of the fragments will be a material of plant, and/or animal, and/or mineral, and/or metal origin.

Figure 5:
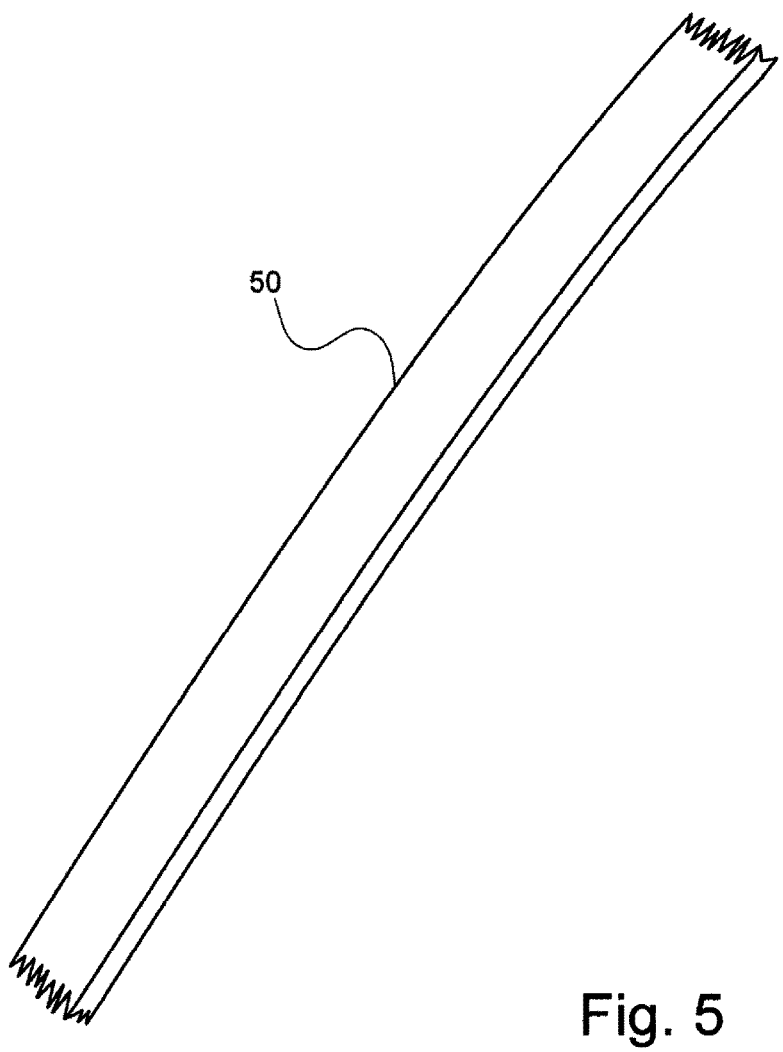
FIG. 5 is an exemplary drawing of a typical wood fragment of regular width.

FIG. 5 illustrates an example of a wood fragment of regular width (50).

Figure 6:
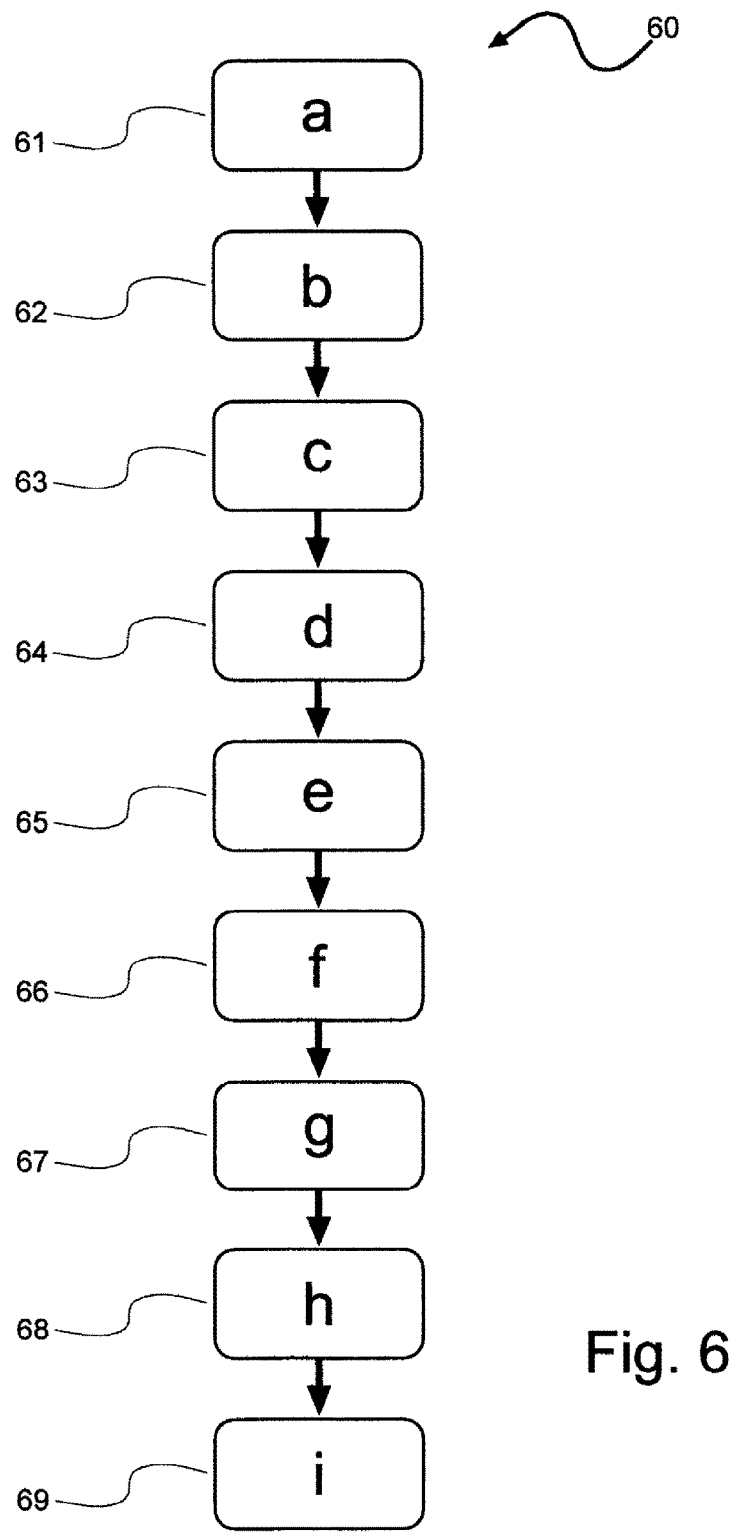
FIG. 6 is a flowchart of a method for the design and manufacture of optimised free-form objects.

FIG. 6 shows the flow diagram (60) of the system and method for designing and manufacturing optimised free-form objects with novel composite materials, and the resulting object. The method starts at block (61).

In block (61) the formal and structural requirements of the object to be manufactured are obtained. In this step, information is received on the required characteristics for the object, both regarding its shape, maximum and minimum dimensions, mechanical performance requirements, maximum weight and other quantifiable variables that the object must have once finished. For example, following the embodiment illustrated in FIG. 1, it may be required that the object is a seat for a specific model of bus, that 30 seats must fit in each bus, that they must support people weighing up to 100 kilograms, that the weight of each seat must not exceed 0.5 kilograms and must have specific shapes to attach to the structure of the bus.

In block (62) the parameters that the object must meet are defined, based on the information on the requirements for the object obtained in the previous step. Continuing with the example of the previous paragraph, in this step the requirements are transformed into specific shape parameters, and into numerical parameters with specific maximums and minimums for the object, such as width, height, thickness, weight, vertical load to be supported, traction and other loads to be supported.

In block (63) the parameters defined in the previous step (62) are entered into one or more computer programs and transformed into an initial digital design that then goes through digital simulations, analysis of results and redesign N times in a feedback loop until obtaining the optimised digital three-dimensional design that meets all the formal and structural requirements in the most efficient way found. This process defines: the general shape of the design for the object; the type and sizes of fragments to be used; the material of the fragments (preferably wood); the size of the fragments; the binder(s) to be used; and, very importantly, the orientation of the fragments according to their shape and the orientation of their fibres, strands or component parts.

In block (64), the optimised digital three-dimensional design is transformed by a computer program into operating instructions for machinery that operates with computerised numerical control (CNC).

In block (65) a mould is obtained, specific to the optimised design obtained through the previous processes.

In block (66) the digital instructions are sent to the CNC machinery so that it deposits the selected materials in the mould. These instructions are data of 3D coordinates and the orientation of each fragment that will be deposited at said coordinates, the detail of whether or not binder will be used, and if binder is used then also the data of 3D coordinates and the respective amounts of binder that will be deposited at the respective coordinates with respect to the mould.

In block (67) the instructions sent to the CNC machinery are executed. It is in this step that the fragments and binders are deposited on the mould.

In block (68) the step of pressing the deposited materials begins. In this step the materials deposited in the mould are pressed with force.

In block (69) the parts of the mould are separated to obtain the finished object.

The invention claimed is:

1. A method for manufacturing optimised free-form objects made of composite materials, that have been previously designed using computer programs for designing, simulating, analysing results, redesigning, simulating and analysing results N times in a data feedback loop, obtaining an optimised 3D design, comprising digital information, and converting the digital information of the design into manufacturing instructions for machinery that operates with computerised numerical control (CNC), wherein the composite material comprises fragments of material and binder(s);

wherein that it comprises the steps of:

(a) providing a mould of at least two parts, namely a lower part of the mould and an upper part of the mould, specific to the optimised design obtained through the design process for the design of the optimised free-form object;

(b) depositing on the lower part of the mould the binder(s) and the fragments of material in intentional and specific coordinates and orientations according to the manufacturing instructions calculated to optimise resistance to any stresses to be borne by the resulting optimised free-form object;

(c) pressing the fragments together with the binder between the parts of the mould;

(d) separating the parts of the mould to remove the finished optimised free-form object.

2. The method of claim 1, wherein that after step (b) of depositing binder and fragments of material and before pressing the fragments together with the binder, the method also comprises: depositing, on the binder(s) and fragments of material deposited in step (b), comprising a first layer, one or more layers of binder and fragments of material in intentional and specific coordinates and orientations according to the digital instructions, to form multiple layers of composite material.

3. The method of claim 2, wherein that the binder and the fragments of material of each of the multiple layers of composite material have their own specific coordinates and orientations.

4. The method of claim 2, wherein the layers of material of the object obtained can be of greater thicknesses in some areas of the object than in others, depending on the formal and mechanical requirements of the object.

5. The method of claim 1, wherein that the mould comprises cooperative parts, and the cooperative parts are brought together to apply force and press the deposited materials therebetween.

6. The method of claim 1, wherein that the fragments of material comprise at least one material from the group consisting of wood, materials of plant origin, materials of animal origin, materials of synthetic origin, materials of mineral origin, metal materials.

7. The method of claim 1, wherein that the fragments of material are of irregular shapes and sizes.

8. The method of claim 1, wherein that the fragments of material are of regular shapes and sizes.

9. The method of claim 1, wherein that the fragments of material comprise a combination of at least two regular shapes and/or sizes.

10. The method of claim 1, wherein that the fragments of material are a combination of regular and/or irregular shapes and/or sizes.

11. The method of claim 1, wherein that the binder comprises at least one binder of the group consisting of an adhesive, a thermoplastic material and vapour.

12. The method of claim 1, wherein that the pressing is performed without heat being applied.

13. The method of claim 1, wherein that the pressing is performed with heat being applied.

* * * * *